United States Patent [19]
Seki et al.

[11] Patent Number: 5,111,532
[45] Date of Patent: May 5, 1992

[54] METHOD OF SETTING DRAWING PARAMETERS FOR AN XY PLOTTER

[75] Inventors: Masaki Seki, Tokyo; Takeshi Hosono, Oshino; Shizuaki Hayanagi, Oshino; Koji Suzuki, Oshino, all of Japan

[73] Assignee: Fanuc Ltd, Minamitsuru, Japan

[21] Appl. No.: 536,552
[22] PCT Filed: Nov. 22, 1989
[86] PCT No.: PCT/JP89/01193
  § 371 Date: Jul. 9, 1990
  § 102(e) Date: Jul. 9, 1990
[87] PCT Pub. No.: WO90/06551
  PCT Pub. Date: Jun. 14, 1990

[30] Foreign Application Priority Data
Nov. 25, 1988 [JP] Japan ................................ 63-296036

[51] Int. Cl.$^5$ ........................................... G06K 15/00
[52] U.S. Cl. ..................................... 395/102; 395/103
[58] Field of Search ........................... 364/518–520, 364/235 MS, 930 MS, 929.3 MS, 237.7 MS; 340/731; 346/154, 139 R, 136, 140 R

[56] References Cited
U.S. PATENT DOCUMENTS
4,725,960 2/1988 Shima et al. ..................... 340/731

Primary Examiner—Arthur G. Evans
Attorney, Agent, or Firm—Staas & Halsey

[57] ABSTRACT

A drawing parameter setting method capable of setting drawing parameters for an XY plotter.

When two vertexes (P1, P2) of a drawing subject region including a figure (F1'), for which a figure conversion process including figure movement, enlargement and reduction has been performed on a CRT screen (5a), are specified, a processor calculates the amount of movement of the figure before and after the conversion and a figure conversion scale, and also calculates coordinate positions ((LDX, LDY), (RUX, RUY), (MX, MY) of the two vertexes and a center (P3) of the drawing subject region. When it is determined that the drawing subject region and plotter paper (100) are similar in shape, based on the calculated ratio between longitudinal and lateral lengths of the drawing subject region and the calculated ratio between those of the plotter paper, the processor calculates the maximum plotting scale by dividing the product of the conversion scale and the longitudinal or lateral length of the plotter paper by the longitudinal or lateral distance between the two vertexes, and automatically determines the coordinate position (OX, OY) of the lower left vertex (P4) of a similar rectangle containing the drawing subject region such that the lower left vertex of the similar rectangle is correlated with the origin (PPO) of a plotter coordinate system. The figure is plotted at a suitable place on the maximum scale in accordance with the amount of movement of the figure origin and the coordinate position of the vertex of the similar rectangle.

3 Claims, 5 Drawing Sheets

FIG.1
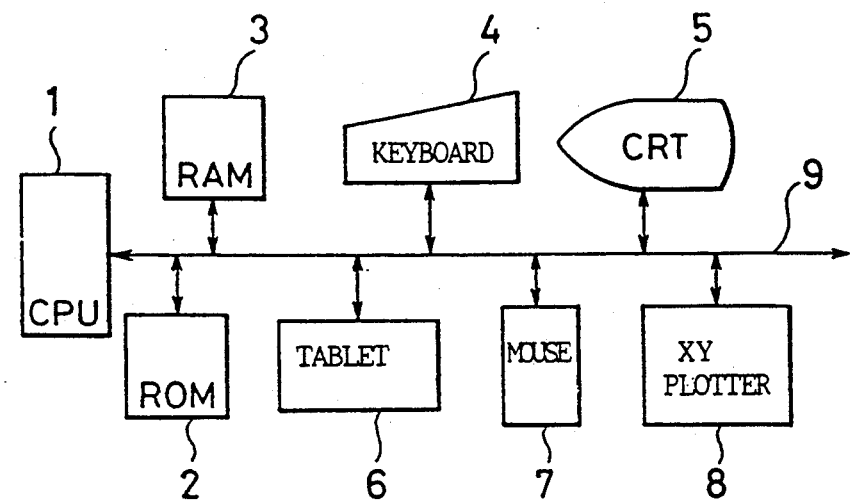
FIG.2
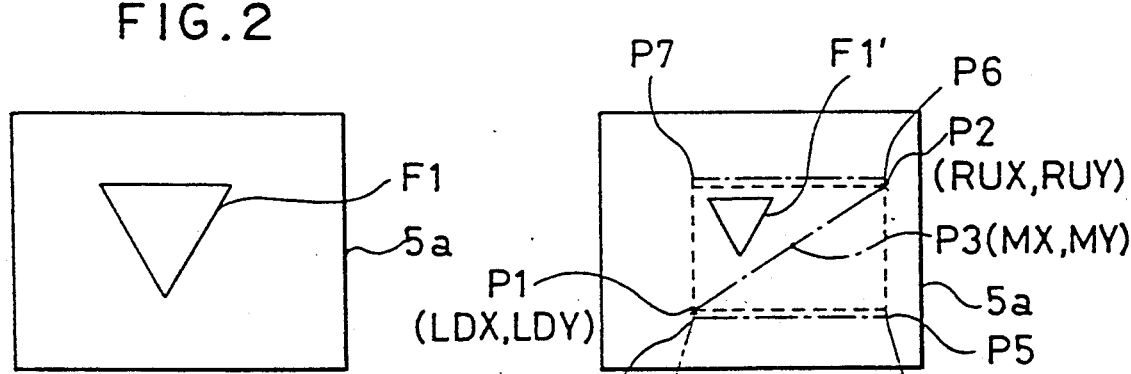
FIG.3
FIG.4
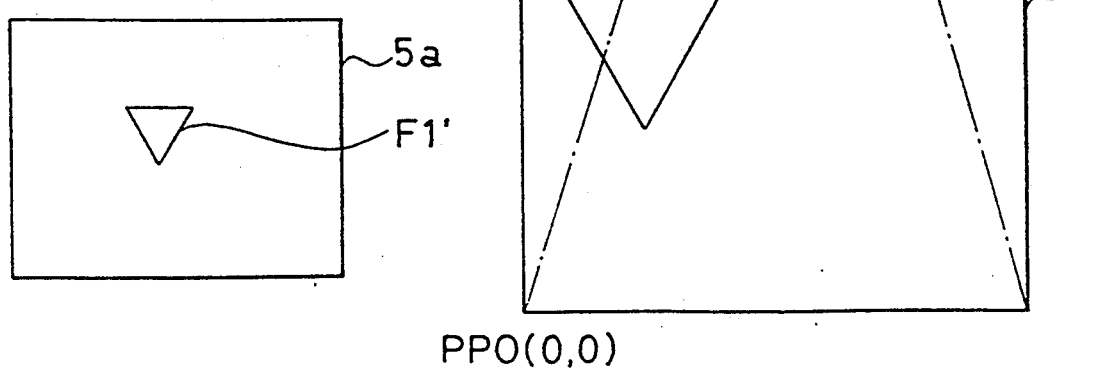

METHOD OF SETTING DRAWING PARAMETERS FOR AN XY PLOTTER

TECHNICAL FIELD

The present invention relates to a drawing parameter setting method capable of easily setting parameters which are used when figures produced by a CAD/CAM system or the like are drawn by an XY plotter.

BACKGROUND ART

Conventionally, when a group of figures (drawing) produced by a CAD/CAM system or the like are drawn by an XY plotter, a rectangular drawing subject region (hereinafter referred to as CRT drawing) including a figure group F1″ (FIGS. 7 and 8) drawn on the screen of a graphic display device is specified by manually inputting the lengths Xmax and Xmin thereof in positive and negative directions of the X axis and the lengths Ymax and Ymin thereof in positive and negative directions of the Y axis to an information processor of the CAD/CAM system through a tablet, a keyboard, and the like. The ratio (plotting scale) of the dimensions of the drawing which is to be drawn by the plotter (hereinafter referred to as plotter drawing) to the dimensions of the CRT drawing is also manually input through the keyboard. Further, to plot the CRT drawing at a suitable place on plotter paper with the former being correlated with the latter, a coordinate position (x0, y0) in the xy coordinate system of the XY plotter, which, for example, corresponds to a CRT drawing origin P″ represented by the origin (0, 0) of the XY coordinate system of the CRT screen, is manually input through the tablet or the like. Subsequently, a drawing command is input through the tablet, whereby the CRT drawing is plotted in a predetermined drawing area of the plotter paper 100 on a predetermined scale by the XY plotter under the control of the information processor so that the origin P″ of the CRT drawing coincides with the coordinate position (x0, y0) of the plotter coordinate system (FIG. 7). In FIG. 7, symbol F2″ denotes a figure group drawn on the plotter paper.

When, instead of manually inputting the plotting scale, an automatic scale setting mode is selected, the information processor automatically sets a maximum scale for plotting the CRT drawing on the plotter paper 100 on the largest possible scale, in accordance with the size of the plotter paper and the dimensions of the CRT drawing, and the XY plotter reproduces the drawing on the maximum scale (FIG. 8).

According to the above-described conventional methods, however, an operator is required to calculate the coordinate position (x0, y0) in the plotter coordinate system corresponding to the CRT drawing origin P″, and to manually input the calculated values to the CAD/CAM system. If the calculation or the manual inputting of the origin is erroneous, the CRT drawing cannot be plotted in the required area of the plotter paper 100, or even the whole of the CRT drawing cannot be drawn on the plotter paper.

DISCLOSURE OF THE INVENTION

An object of the present invention is to provide a drawing parameter setting method capable of easily, rapidly and appropriately setting parameters which are used when figures produced by a CAD/CAM system or the like are drawn by an XY plotter.

To achieve the above object, a drawing parameter setting method for an XY plotter according to the present invention comprises the steps of: (a) manually setting, on a graphic display screen for which a first two-dimensinal coordinate system is set, a rectangular region which includes a figure drawn on the graphic display screen and which is to be plotted by an XY plotter for which a second two-dimensional coordinate system is set; (b) automatically determining a plotting scale in accordance with longitudinal and lateral lengths of the rectangular region and longitudinal and lateral lengths of a plotter paper; and (c) automatically determining at least one coordinate parameter value for correlating the first and second coordinate systems with each other, in accordance with the longitudinal and lateral lengths of the rectangular region and those of the plotter paper.

As described above, according to the present invention, the coordinate parameter values for correlating the two coordinate systems set for the graphic display screen and the XY plotter, respectively, are automatically determined in accordance with the plotting scale which is automatically determined in accordance with the longitudinal and lateral lengths of the rectangular region on the graphic display screen including figures to be drawn on the plotter paper, and those of the plotter paper. Accordingly, it is enough to manually set substantially only the drawing region, and hence the drawing parameters for the XY plotter can be easily, quickly and accurately set, without the need of operator's calculation.

BRIEF DESCRIPTION OF THE DRAWINGS

FIG. 1 is a schematic block diagram showing a CAD system to which a drawing parameter setting method according to one embodiment of the present invention is applied;

FIG. 2 is a diagram showing a figure drawn on a CRT screen of the system of FIG. 1;

FIG. 3 is a diagram showing a figure drawn on the CRT screen after a figure conversion;

FIG. 4 is a diagram showing a correlation between a drawing subject region specified on the CRT screen and a plotter paper;

Figure 5:
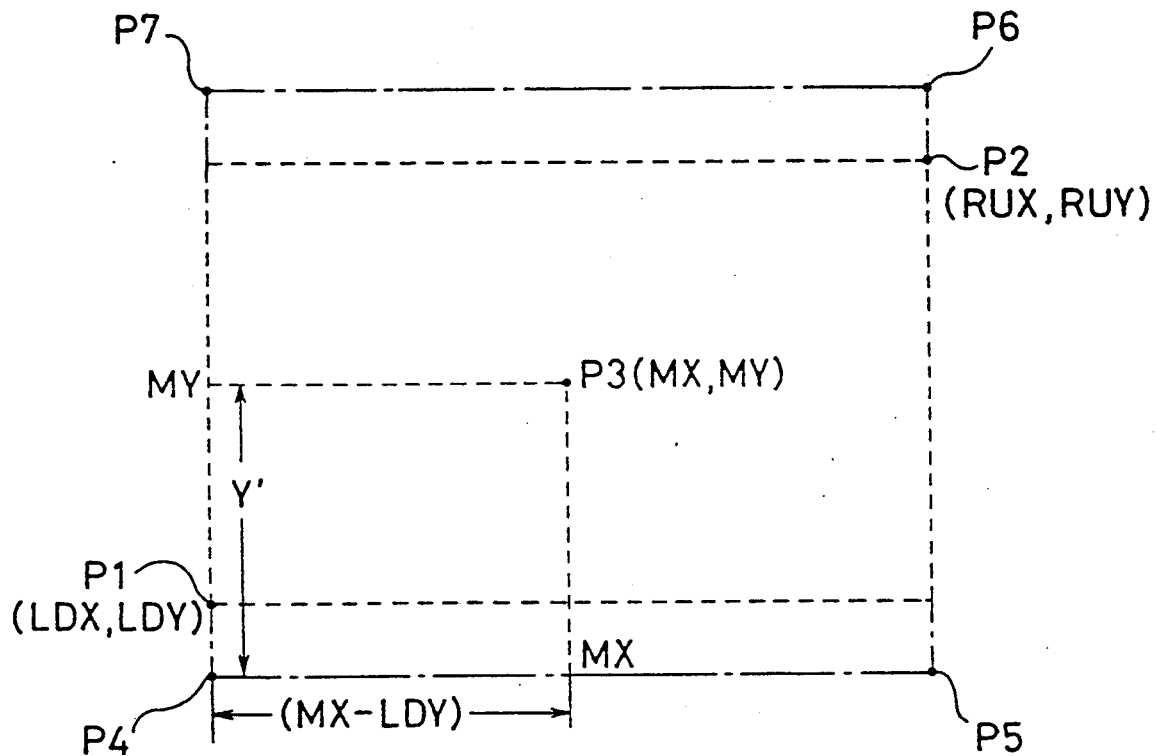
FIG. 5 is a diagram showing drawing parameters.

Best Mode of Carrying Out the Invention

Referring to FIG. 1, a CAD system to which a drawing parameter setting method according to one embodiment of the present invention is applied comprises a processor (hereinafter referred to as CPU) 1, a ROM 2, a RAM 3, a keyboard 4, a graphic display device (hereinafter referred to as CRT) 5, a tablet 6, a mouse 7, and an XY plotter 8, as conventionally known, the elements 2 through 8 being connected to the CPU 1 through a bus 9. Drawing data, produced by using the tablet 6 and/or the mouse 7 or transferred from an external memory (not shown), is stored in the RAM 3 under the control of the CPU 1 which operates in accordance with a control program stored in the ROM 2.

The operation of the above CAD system will be described with reference to FIGS. 2 through 6.

First, an operator operates the keyboard 4, the tablet 6, etc. to select a subject FIG. F1 to be drawn (generally, a group of figures), whereby the FIG. F1 is drawn on a CRT screen 5a, as shown in FIG. 2, in accordance with corresponding one of the drawing data stored in the RAM 3 and expressed in terms of an XY coordinate system, i.e., a two-dimensional Cartesian coordinate system (hereinafter referred to as CRT coordinate system) previously set for the CRT screen 5a. The CRT coordinate system is previously set such that, for example, the origin thereof coincides with the lower left corner of the CRT screen 5a.

To plot the figure or a desired portion thereof in a required area of plotter paper 8a on a required scale, in other words, to permit a drawing subject region (described later) to be suitably positioned on the CRT screen 5a, the operator carries out movement, enlargement or reduction of the figure (figure conversion operation), by using the tablet 6 and/or the mouse 7, whereby the CPU 1 executes a process of figure movement, enlargement or reduction (figure conversion process) accordingly, as known in the art (step S1 in FIG. 6). Consequently, the FIG. F1 is moved, and/or enlarged or reduced, and the processed FIG. F1' is drawn (FIG. 3).

When, after completing the figure conversion, the operator operates the tablet 6 to pick a drawing parameter setting command (step S2), the CPU 1 calculates the amount of movement of the origin (e.g., one of the vertexes) of the FIG. F1 before and after the figure conversion process and the ratio Sc (figure conversion scale) of the dimensions of the FIG. F1' after the figure conversion process to those of the FIG. F1 before the figure conversion process, because the position of the figure origin is varied on the CRT screen 5a due to a figure conversion involving figure movement or the dimensions of the figure are varied due to a figure conversion involving figure enlargement/reduction (step S3). In the case of a CAD system unable to automatically extract required characteristic points of a figure including the figure origin which are used in the calculation of the amount of movement of the figure origin and the figure conversion scale Sc, the operator may operate the tablet 6 or the like to pick the figure origin etc.

When the operator then specifies (or inputs by picking), on the CRT screen, the positions of a lower left vertex P1 and an upper right vertex P2 (FIG. 3) determining the rectangular drawing subject region, by using the tablet 6, the CPU 1 calculates coordinate positions (LDX, LDY) and (RUX, RUY) in the CRT coordinate system respectively corresponding to the thus picked vertexes P1 and P2 (step S4). Subsequently, a coordinate position (MX, MY) in the CRT coordinate system corresponding to the middle point of the line connecting the vertexes P1 and P2, i.e., the center P3 of the rectangular drawing subject region, are calculated from the following equations (1) and (2) (step S5):

$$MX = (RUX - LDX)/2 \quad (1)$$

$$MY = (RUY - LDY)/2 \quad (2)$$

Further, the ratio Dc of the longitudinal length (in the Y axis direction) of the rectangular drawing subject region to the lateral length (in the X axis direction) of the same region and the ratio Dp of the longitudinal length H of the plotter paper 8a to the lateral length W of same are calculated by the following equations (3) and (4), respectively:

$$Dc = (RUY - LDY)/(RUX - LDX) \quad (3)$$

$$Dp = H/W \quad (4)$$

Next, the CPU 1 determines whether or not the ratio Dc is greater than the ratio Dp (step S6), in other words, it is determined whether the shape of the drawing subject region is elongated from top to bottom or from side to side, compared to the shape of the plotter paper. If the ratios Dc and Dp are equal, then the drawing subject region and the plotter paper 8a are similar in shape.

When the shape of the drawing subject region is elongated from side to side (Dc<Dp), compared to the shape of the plotter paper, namely, when it is determined that the product of the longitudinal length of the drawing subject region and the plotting scale is smaller than the longitudinal length H of the plotter paper if a plotting scale is so selected that the product of the lateral length of the drawing subject region and the plotting scale coincides with the lateral length of the plotter paper 8a, and hence a maximum plotting scale S is restricted by the lateral length W of the plotter paper, the CPU 1 calculates the maximum plotting scale S by the following equation (5) (step S7):

$$S = Sc \cdot W/(RUX - LDX) \quad (5)$$

To permit the whole of the drawing subject region to be plotted at a suitable place on the plotter paper 8a even when using the maximum plotting scale S, the CPU 1 computers, in accordance with the below-mentioned equation (6) and (9), a coordinate position (OX, OY) in the CRT coordinate system corresponding to a lower left vertex P4 of that rectangle which includes the whole of the drawing subject region, is similar to the shape of the plotter paper, and is defined by four vertexes P4 to P7 (hereinafter referred to as similar rectangle), at step S8.

In FIG. 4, the lower left vertex of the plotter paper 8a is indicated at PPO(0, 0). This means that in this embodiment, a two-dimensional Cartesian coordinate system which is previously set for the XY plotter 8 (hereinafter referred to as plotter coordinate system) is set such that the origin thereof coincides with the lower left vertex PPO of the plotter paper 8a. The vertex P4 of the similar rectangle is correlated with the lower left vertex of the plotter paper 8a, i.e., with the origin of the plotter coordinate system. The coordinate position (OX, OY) of the vertex P4 and the amount of movement of a figure due to the aforesaid figure conversion serve as coordinate parameters for correlating the origins of the CRT coordinate system and plotter coordinate system with each other.

When the shape of the drawing subject region is elongated from side to side (Dc<Dp) as compared to the shape of the plotter paper, the X-axis coordinate position OX of the lower left vertex P4 of the similar rectangle is brought into coincidence with the X-axis coordinate position LDX of the lower left vertex P1 of the drawing subject region. Namely, the CPU 1 calculates the X-axis coordinate position OX by the following equation (6):

$$OX = LDX \quad (6)$$

Next, the CPU 1 calculates the Y-axis coordinate position of the lower left vertex P4 of the similar rectangle in the CRT coordinate system, in accordance with equation (9) which is derived in the following manner. Since the similar rectangle and the plotter paper 8a are similar in shape, the following formula (7) is fulfilled:

$$(MX-LDX):W/2 = Y':H/2 \quad (7)$$

where the value Y' represents the distance along the Y axis between the center P3(MX, MY) of the drawing subject region and the lower left vertex P4 of the similar rectangle.

By arranging the formula (7), the following equation (8) is derived:

$$Y' = (MX-LDX) \cdot H/W \quad (8)$$

From equations (4) and (8) and FIG. 5, the following equation (9) stands:

$$OY = MY - Dp(MX-LDX) \quad (9)$$

On the other hand, when it is determined at step S6 that the shape of the drawing subject region is elongated from top to bottom (Dc>Dp), compared to the shape of the plotter paper, namely, when it is determined that the product of the lateral length of the drawing subject region and the plotting scale is smaller than the lateral length W of the plotter paper if a plotting scale is so selected that the product of the longitudinal length of the drawing subject region and the plotting scale coincides with the longitudinal length H of the plotter paper 8a, and hence the maximum plotting scale S is restricted by the longitudinal length H of the plotter paper, the CPU 1 calculates the maximum plotting scale S by the equation S=Sc·H/(RUY−LDY) (step S9).

Further, when Dc>Dp stands, the CPU 1 calculates the coordinate position OY by the equation OY=LDY (step S10), so that the Y-axis coordinate position OY of the lower left vertex P4 of the similar rectangle coincides with the Y-axis coordinate position LDY of the lower left vertex P1 of the drawing subject region. The CPU 1 then calculates the X-axis coordinate position OX of the vertex P4 of the similar rectangle by the equation OX=MX−(MY-LDY)/Dp, which stands due to the similarity in shape between the similar rectangle and the plotter paper 8a (step S10).

Figure 6:
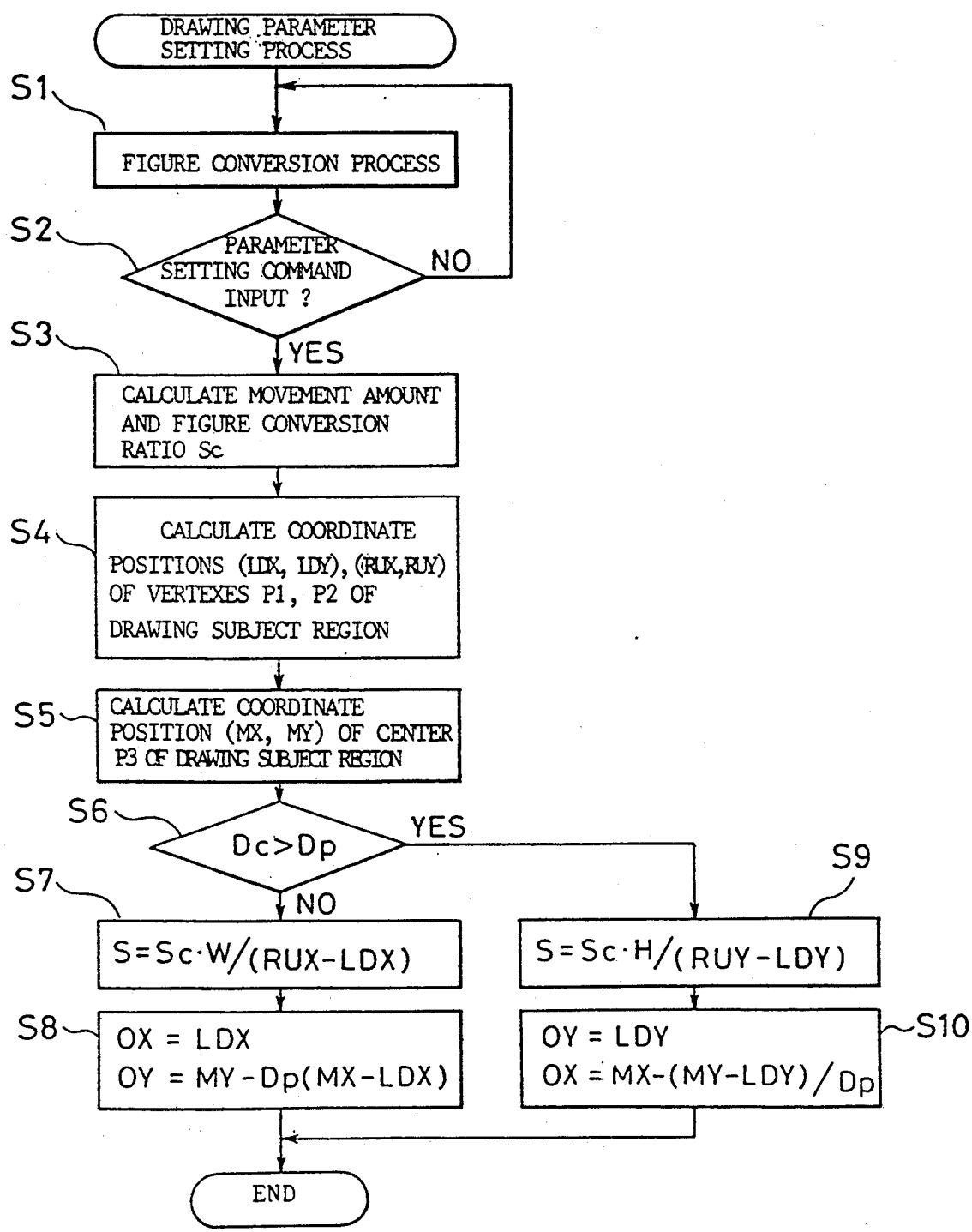
FIG. 6 is a flowchart of a drawing parameter setting process executed by the system of FIG. 1.
Figure 7:
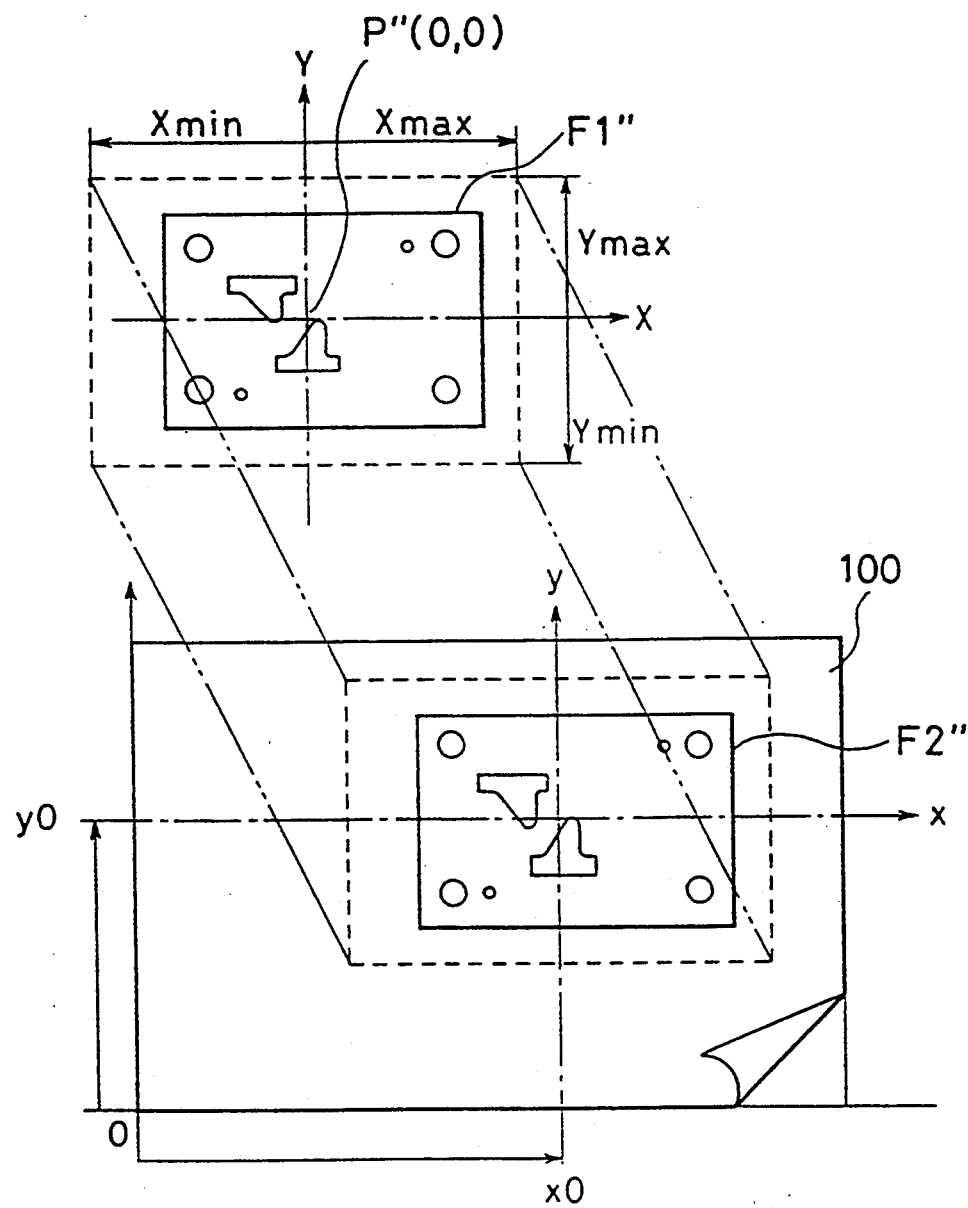
FIG. 7 is a diagram showing a conventional plotting method.
Figure 8:
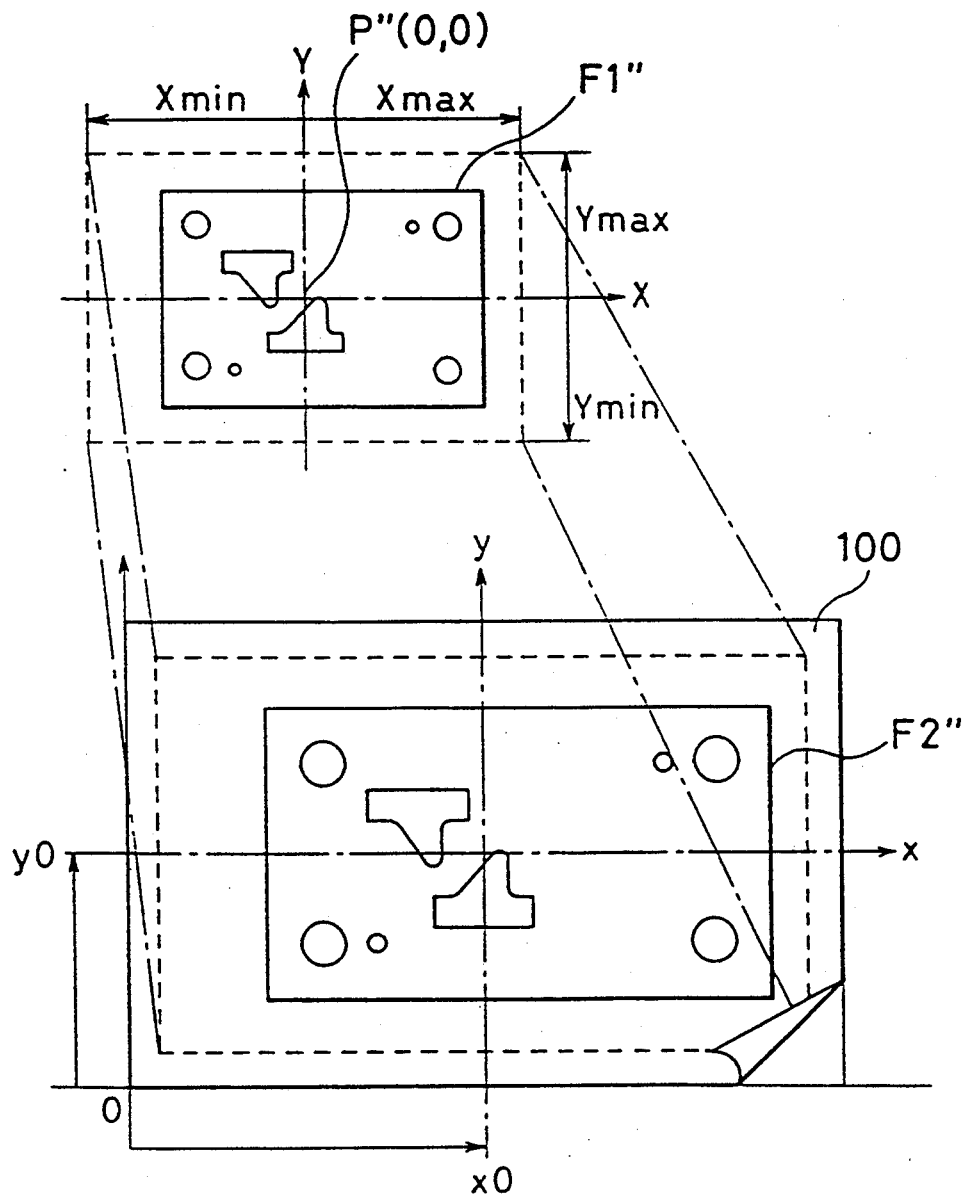
FIG. 8 is a diagram showing another conventional plotting method.

When it is determined that the drawing subject region and the plotter paper 8a are of similar shape (Dc=Dp), the CPU 1 calculates the maximum plotting scale S by the equation S=Sc·W/(RUX−LDX) or the equation S=Sc·H(RUY−LDY), and then calculates the X- and Y-axis coordinate positions OX and OY of the vertex P4 of the similar rectangle, which is similar to the drawing subject region, although an illustration is omitted in FIG. 6. Alternatively, either one set of maximum plotting scale/coordinate position calculating steps, corresponding to the steps S7 and S8 or to the steps S9 and S10 alone may be executed.

As described above, the drawing parameter setting process which includes an automatic setting of the amount of movement of the figure origin and the figure conversion scale, a manual setting of the drawing subject region, an automatic setting of the maximum plotting scale S, and an automatic setting of the coordinate position (OX, OY) of a vertex of the similar rectangle is quickly and properly carried out.

When the operator operates the tablet 6 to pick a plotting mode after completion of the drawing parameter setting, namely, when the CPU 1 is supplied with a plotting command, the CPU 1 converts the drawing data represented by the CRT coordinate system into plotting data represented by the plotter coordinate system, based on the maximum plotting scale S, the amount of movement of the figure before and after the conversion process (from the figure F1 to F1'), and the coordinate position (OX, OY) of the vertex P4 of the similar rectangle corresponding to the origin of the plotter coordinate system, and controls the operation of the XY plotter 8 in accordance with the resultant plotting data. As a result, the figure F1' drawn on the CRT screen is plotted on the plotter paper 8a on the maximum plotting scale S by the XY plotter 8 under the control of the CPU 1. Moreover, the plotting is effected such that the figure plotted by the plotter is similar to that drawn on the CRT screen and the four sides, i.e., right, left, upper and lower sides, of the similar rectangle coincide with the corresponding edges of the plotter paper, whereby the figure can be accurately positioned in a predetermined position region of the plotter paper.

The present invention is not limited to the above embodiment, and various modifications are possible. For example, in the above embodiment, the rectangular drawing subject region is set by specifying the lower left vertex P1 and the upper right vertex P2 thereof, but may alternatively be set by specifying the upper-left and lower-right vertexes or all four vertexes thereof. Further, the maximum plotting scale calculated in step S7 or S8 may be shown on the CRT screen 5a and/or the plotter paper 8a.

We claim:

1. A drawing parameter setting method for transferring a portion of a figure from a graphic display screen to plotter paper of an XY plotter, said method comprising the steps of:
   (a) manually specifying, on a graphic display screen, two vertices of a rectangular image region in a first two-dimensional coordinate system which define the portion of the figure drawn on the graphic display screen;
   (b) automatically determining a plotting scale in accordance with a first longitudinal length and a first lateral length of the rectangular region and a second longitudinal length and a second lateral length of the plotter paper for the XY plotter having a second two-dimensional coordinate system;
   (c) automatically determining at least one coordinate parameter value for correlating the first two-dimensional coordinate system and the second two-dimensional coordinate system, in accordance with the first longitudinal length and the first lateral length of the rectangular image region and the second longitudinal length and the second lateral length of the plotter paper; and
   (d) commanding the XY plotter to plot the portion of the figure on the plotter paper based on the plotting scale determined in said step (b) and the coordinate parameter determined in said step (c).

2. A drawing parameter setting method according to claim 1,
   wherein said method further comprises the steps of:

(e) calculating a first ratio of the first longitudinal length and the first lateral length of the rectangular image region;

(f) calculating a second ratio of the second longitudinal length and the second lateral length of the plotter paper;

(g) comparing a first shape of the rectangular image region of the plotter paper, based on the first and second ratios, to determine if the rectangular image region is proportional to the plotter paper; and (h) automatically determining a rectangular plot region proportional to the plotter paper, when said step (g) determines the rectangular image region is not proportional to the plotter paper; wherein said rectangular plot region is determined such that a pair of opposed sides thereof, determined by the comparison in said step (g), coincide with a corresponding pair of opposed sides of the rectangular image region; and wherein in said step (b) comprises the substep of (b1) automatically determining the plotting scale in accordance with a length along a side of the rectangular portion in which another pair of opposed sides of the rectangular plot region extends and a length of the plotter paper along the same direction, when said step (g) determines that the rectangular image region and the plotter paper are not proportional;

wherein in said step (c) comprises the substep of (c1) automatically determining a coordinate position of one vertex of the rectangular plot region in the first two-dimensional coordinate system, serving as said coordinate parameter value, such that said one vertex of the rectangular plot region is correlated with a corresponding one of vertexes of the plotter paper; and wherein said step (d) comprises the substep (d1) commanding the plotter to plot the portion of the figure in the rectangular plot region on the plotter paper.

3. A drawing parameter setting method according to claim 1, wherein said method further comprises the step of (e) carrying out figure conversion including at least one of on-screen movement, enlargement, and reduction of the figure drawn on the graphic display screen prior to said step (a), and including a figure movement process; and wherein said step (c) includes the substep of (c1) determining said at least one coordinate parameter value as an amount of the figure based on the figure conversion of said step (d);

wherein said step (b) comprises the substep of (b1) automatically determining a figure conversion scale in accordance with dimensions of the figure before and after the figure conversion of said step (e) and (b2) automatically determining said plotting scale based on said figure conversion scale.

* * * * *